US009329735B2

(12) United States Patent
Tun et al.

(10) Patent No.: US 9,329,735 B2
(45) Date of Patent: May 3, 2016

(54) TOUCH CIRCUIT CHIP AND TOUCH APPARATUS USING THE SAME

(71) Applicant: AU OPTRONICS CORP., Hsinchu (TW)

(72) Inventors: Kyaw Kyaw Tun, Hsin-Chu (TW);
Chao-Chen Wang, Hsin-Chu (TW);
Chao-Chuan Chen, Hsin-Chu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 305 days.

(21) Appl. No.: 13/936,293

(22) Filed: Jul. 8, 2013

(65) Prior Publication Data

US 2014/0240275 A1    Aug. 28, 2014

(30) Foreign Application Priority Data

Feb. 7, 2013   (TW) .............................. 102104939 A

(51) Int. Cl.
*G06F 3/044*     (2006.01)
*G06F 3/041*     (2006.01)
*G01D 18/00*     (2006.01)
*G01D 5/24*      (2006.01)

(52) U.S. Cl.
CPC .............. *G06F 3/044* (2013.01); *G06F 3/0416* (2013.01); *G01D 5/24* (2013.01); *G01D 18/004* (2013.01)

(58) Field of Classification Search
CPC ..... G06F 3/0416; G06F 3/0418; G06F 3/044; G01D 5/24; G01D 18/004; G01P 15/125; G01R 27/2605
See application file for complete search history.

(56) References Cited

U.S. PATENT DOCUMENTS

| 8,170,822 B2* | 5/2012 | Lu .......................... H03K 17/962 702/71 |
| 8,599,167 B2* | 12/2013 | Joharapurkar et al. ....... 345/174 |
| 2007/0257890 A1* | 11/2007 | Hotelling et al. ............. 345/173 |
| 2011/0063246 A1 | 3/2011 | Wei et al. |
| 2011/0261005 A1* | 10/2011 | Joharapurkar et al. ....... 345/174 |

(Continued)

FOREIGN PATENT DOCUMENTS

| TW | 200733559 | 9/2007 |
| TW | 201035842 | 10/2010 |

(Continued)

OTHER PUBLICATIONS

Taiwan Patent Office, "Office Action", Mar. 23, 2015.

*Primary Examiner* — Quan-Zhen Wang
*Assistant Examiner* — Xuemei Zheng
(74) *Attorney, Agent, or Firm* — WPAT, PC; Justin King

(57) ABSTRACT

A touch circuit chip includes a load adjustment unit and a comparator. The load adjustment unit adjusts a determined impedance value according to an impedance matching signal. The first comparator has a first end electrically coupled to a first load and from which to receive a sensing signal, a second end electrically coupled to a second load via the load adjustment unit and from which to receive a reference signal, and an output end. The comparator compares the received sensing signal with the received reference signal and accordingly output a comparison result. The touch circuit chip determines whether there exists a change of a capacitance value of a coupling capacitor between the first and second loads according to the comparison result, wherein the determined impedance value is matched to the impedance value of the coupling capacitor and the first load. A touch apparatus is also provided.

22 Claims, 5 Drawing Sheets

(56) References Cited

U.S. PATENT DOCUMENTS

2012/0218222 A1* 8/2012 Shen et al. .................... 345/174
2013/0147756 A1* 6/2013 Chan ....................... G06F 3/044
                                                        345/174

FOREIGN PATENT DOCUMENTS

TW          201110005      3/2011
TW           I365620       6/2012

* cited by examiner

TOUCH CIRCUIT CHIP AND TOUCH APPARATUS USING THE SAME

TECHNICAL FIELD

The present disclosure relates to a touch control technical field, and more particularly to a touch circuit chip and a touch apparatus using the same.

BACKGROUND

With the advances in technology, touch device has become a new man-machine interactive interface widely used in electronic products due to its intuitive and human nature features.

FIG. 1 is a schematic view of a conventional touch apparatus. As shown, the conventional touch apparatus 10 includes a touch panel 100 and a touch circuit chip 110. The touch panel 100 includes a plurality of driving electrodes (herein are exemplified by driving electrodes 101a~101e) and a plurality of sensing electrodes (herein are exemplified by sensing electrodes 103a~103e). The driving electrodes 101a~101e and the sensing electrodes 103a~103e are arranged in an intersection manner; and a coupling capacitor Cm is formed at each of the intersecting points resulted by the intersection of the driving electrodes 101a~101e and the sensing electrodes 103a~103e. The touch circuit chip 110 is configured to transmit driving signals to the driving electrodes 101a~101e via driving lines 105 and receive sensing signals outputted from the sensing electrodes 103a~103e via sensing lines 107, respectively. In addition, the touch circuit chip 110 is further configured to perform a comparison operation on the last-time-received sensing signals and accordingly generate a comparison result. Thus, the touch circuit chip 110 can determine whether there exists a change of the coupling capacitor according to the aforementioned comparison result and consequentially determines whether the touch panel 100 is being touched by a finger or a conductive object or not.

However, while the touch apparatus 10 is being affected by noise, the touch circuit chip 110 may generate an incorrect comparison result due to this comparison result is obtained by a comparison between the prior sensing signal without being affected by noises and the current sensing signal affected by noises; consequentially, the touch circuit chip 110 may determine whether there exists a change of the coupling capacitor according to the incorrect comparison result and mistakenly determines whether the touch panel 100 is being touched by a finger or a conductive object or not. To avoid the effect of noises, a plurality of filters are needed to be arranged in the conventional touch circuit chip 110.

SUMMARY

The present disclosure provides a touch circuit chip, which includes a load adjustment unit and a comparator. The load adjustment unit is configured to adjust a determined impedance value according to an impedance matching signal. The comparator has a first end, a second end and an output end. The first end of the first comparator is electrically coupled to a first load and from which to receive a sensing signal. The second end of the first comparator is electrically coupled to a second load via the load adjustment unit and from which to receive a reference signal. The first comparator is configured to compare a voltage of the received sensing signal with a voltage of the received reference signal and accordingly output a comparison result via the output end thereof. The touch circuit chip is configured to determine whether there exists a change of a capacitance value of a coupling capacitor between the first and second loads according to the comparison result, wherein the determined impedance value is matched to the impedance value of the coupling capacitor and the first load.

The present disclosure further provides a touch apparatus, which includes a touch panel and a touch circuit chip. The touch panel includes a plurality of driving electrodes and a plurality of sensing electrodes arranged in an intersection manner; and a coupling capacitor is formed at each of intersecting points resulted by the intersection of the driving electrodes and the sensing electrodes. The touch circuit chip is electrically coupled to the touch panel and includes a load adjustment unit and a comparator. The load adjustment unit is configured to adjust a determined impedance value according to an impedance matching signal, and the determined impedance value is matched to an impedance value of the coupling capacitor and one of the sensing electrodes. The comparator has a first end, a second end and an output end. The first end of the comparator is electrically coupled to one of the sensing electrodes and from which to receive a sensing signal. The second end of the comparator is electrically coupled to one of the driving electrodes via the load adjustment unit and from which to receive a reference signal. The comparator is configured to compare a voltage of the received sensing signal with a voltage of the received reference signal and accordingly output a comparison result via the output end thereof. The touch circuit chip is configured to determine whether there exists a change of a capacitance value of the coupling capacitors according to the comparison result.

BRIEF DESCRIPTION OF THE DRAWINGS

The present disclosure will become more readily apparent to those ordinarily skilled in the art after reviewing the following detailed description and accompanying drawings, in which.

DETAILED DESCRIPTION OF PREFERRED EMBODIMENTS

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
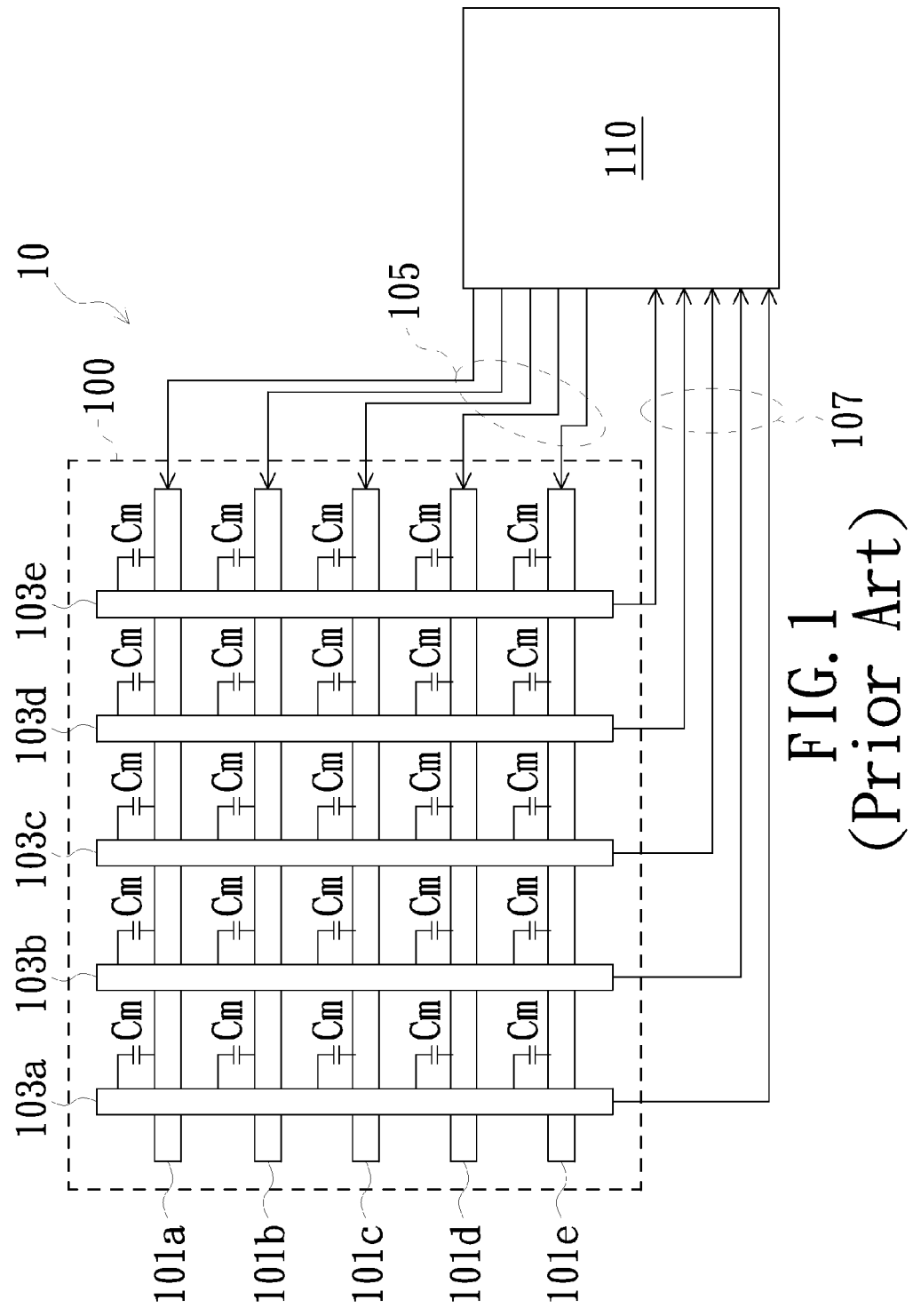
FIG. 1 is a schematic view of a conventional touch apparatus.
Figure 2:
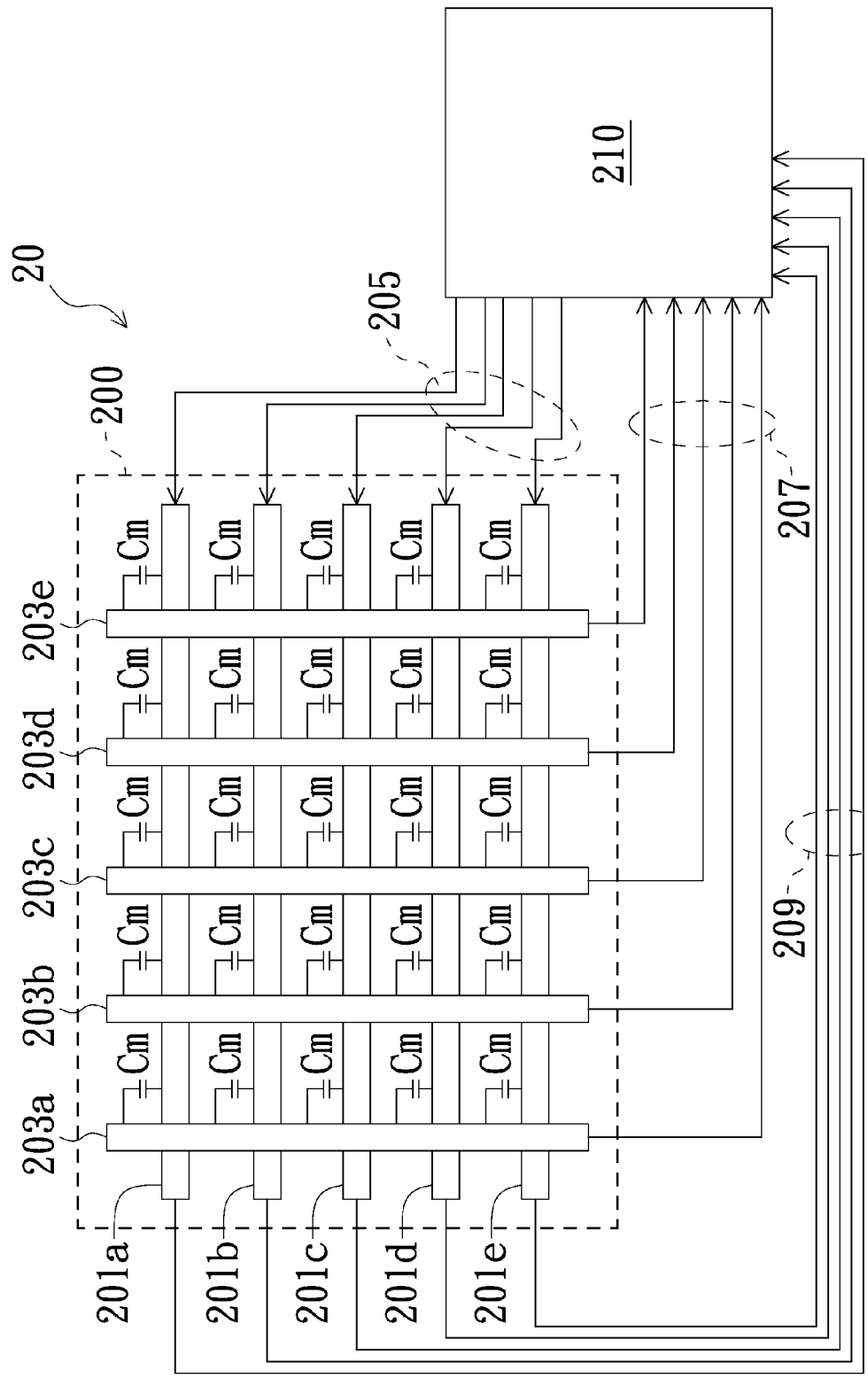
FIG. 2 is a schematic view of a touch apparatus in accordance with an embodiment of the present disclosure.

FIG. 2 is a schematic view of a touch apparatus in accordance with an embodiment of the present disclosure. As shown, the touch apparatus 20 in this embodiment includes a touch panel 200 and a touch circuit chip 210. The touch panel 200 includes a plurality of driving electrodes (herein are exemplified by driving electrodes 201a~201e) and a plurality of sensing electrodes (herein are exemplified by sensing electrodes 203a~203e). The driving electrodes 201a~201e and the sensing electrodes 203a~203e are arranged in an intersection manner; and a coupling capacitor Cm is formed at each of the intersecting points resulted by the intersection of the driving electrodes 201a~201e and the sensing electrodes 203a~203e. It is to be noted that the sensing electrodes 203a~203e are exemplarily disposed on the driving electrodes 201a~201e in FIG. 2; but the present disclosure is not limited thereto. In another embodiment, the driving electrodes 201a~201e may be disposed on the sensing electrodes 203a~203e. The touch circuit chip 210 is configured to transmit driving signals to the driving electrodes 201a~201e via driving lines 205, receive sensing signals outputted from the sensing electrodes 203a~203e via sensing lines 207, and receive reference signals outputted from the driving electrodes 201a~201e via reference lines 209, respectively. To get a better understanding of the present disclosure, the operation of the driving electrodes 201a~201e and the sensing electrodes 203a~203e is described in detail by using the driving electrode 201a and the sensing electrode 203a only; wherein because the driving electrodes 201b~201e and the sensing electrodes 203b~203e have operations similar to that of the driving electrode 201a and the sensing electrode 203a, respectively, and no redundant detail is to be given herein.

Figure 3:
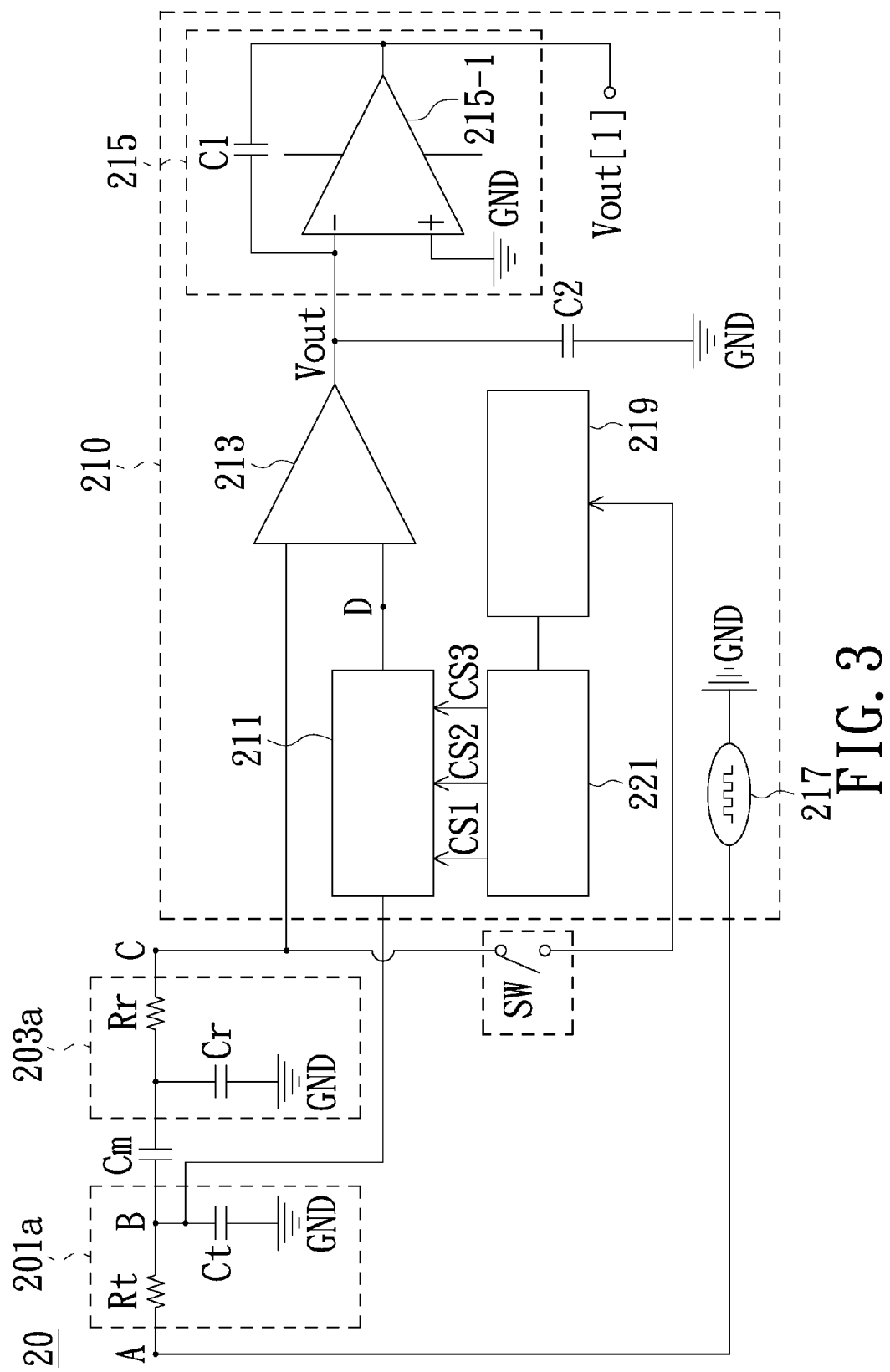
FIG. 3, is a schematic view of an equivalent circuit diagram of the driving electrode, the sensing electrode and the touch circuit chip shown in FIG. 2.

Please refer to FIG. 3, which illustrates an equivalent circuit diagram of the driving electrode 201a, the sensing electrode 203a and the touch circuit chip 210. Specifically, the impedance of the driving electrode 201 a (may be also referred to as a second load) is represented by a resistor Rt and a capacitor Ct; the impedance of the sensing electrode 203a (may be also referred to as a first load) is represented by a resistor Rt and a capacitor Cr; and the impedance of the driving electrode 201a and the impedance of the sensing electrode 203a are electrically coupled to each other via the aforementioned coupling capacitor Cm.

The touch circuit chip 210 includes a load adjustment unit 211, a comparator 213, a readout amplification unit 215 and a signal source 217. The load adjustment unit 211 is configured to adjust, according to an impedance matching signal, a determined impedance value to match (or equal) to the impedance value of the coupling capacitor Cm and the sensing electrode 203a; wherein the related detail will be described later. The comparator 213 has a first end, a second end and an output end. The first end of the comparator 213 is electrically coupled to the sensing electrode 203a and from which to receive the sensing signal. The second end of the comparator 213 is electrically coupled to the driving electrode 201a via the load adjustment unit 211 and from which to receive the reference signal. The comparator 213 is configured to compare the voltage of the received sensing signal with that of the received reference signal and accordingly output a comparison result Vout via the output end thereof. The touch circuit chip 210 is configured to determine whether there exists a change on the capacitance of the coupling capacitor Cm according to the comparison result Vout. Specifically, the touch panel 200 in FIG. 2 is determined as not being touched by a finger or a conductive object if the voltage absolute value of the comparison result Vout, outputted from the output end of the comparator 213, is zero; alternatively, the touch panel 200 is determined as being touched by a finger or a conductive object if the voltage absolute value of the comparison result Vout is greater than zero. The readout amplification unit 215, electrically coupled to the output end of the comparator 213, is configured to amplify the comparison result Vout outputted from the comparator 213 and accordingly generates an amplification signal Vout[1]; wherein the touch circuit chip 210 may determine whether there exists a change of the capacitance of the coupling capacitor Cm according to the amplification signal Vout[1] generated by the readout amplification unit 215. As illustrated in FIG. 3, the readout amplification unit 215 includes a comparator 215-1 and a capacitor C1. The comparator 215-1 has a first end, a second end and an output end. The first end of the comparator 215-1 is electrically coupled to the output end of the comparator 213; and the second end of the comparator 215-1 is electrically coupled to ground GND. The capacitor C1 has a first end and a second end. The first end of the capacitor C1 is electrically coupled to the first end of the comparator 215-1; and the second end of the capacitor C1 is electrically coupled to the output end of the comparator 215-1. The signal source 217 is configured to provide the driving signal to the driving electrode 201a. In addition, the output end of the comparator 213 is electrically coupled to ground GND via a capacitor C2.

In an embodiment, the touch circuit chip 210 may further include a dynamic detection unit 219 and a control unit 221. The dynamic detection unit 219, selectively electrically coupled to the sensing electrode 203a through a switch SW, is configured to detect the impedance of the sensing electrode 203a and the coupling capacitor Cm and accordingly output a detection information. Specifically, the switch SW is switched-off while the predetermined impedance value is adjusted, by the load adjustment unit 211, to match to that of the sensing electrode 203a and the coupling capacitor Cm. In an embodiment, the dynamic detection unit 219 first calculates the impedance value of the sensing electrode 203a and the coupling capacitor Cm according to the voltage, the current or the both outputted from the sensing electrode 203a, and accordingly generates the aforementioned detection information. The control unit 221, electrically coupled to the dynamic detection unit 219, is configured to receive the detection information, compare the detection information with a lookup table stored therein, and output a first control signal CS1, a second control signal CS2 and a third control signal CS3 according to the comparison result. In other words, it is to be noted that the impedance matching signal, received by the load adjustment unit 211, includes at least a first control signal CS1, at least a second control signal CS2 and at least a third control signal CS3.

Figure 4:
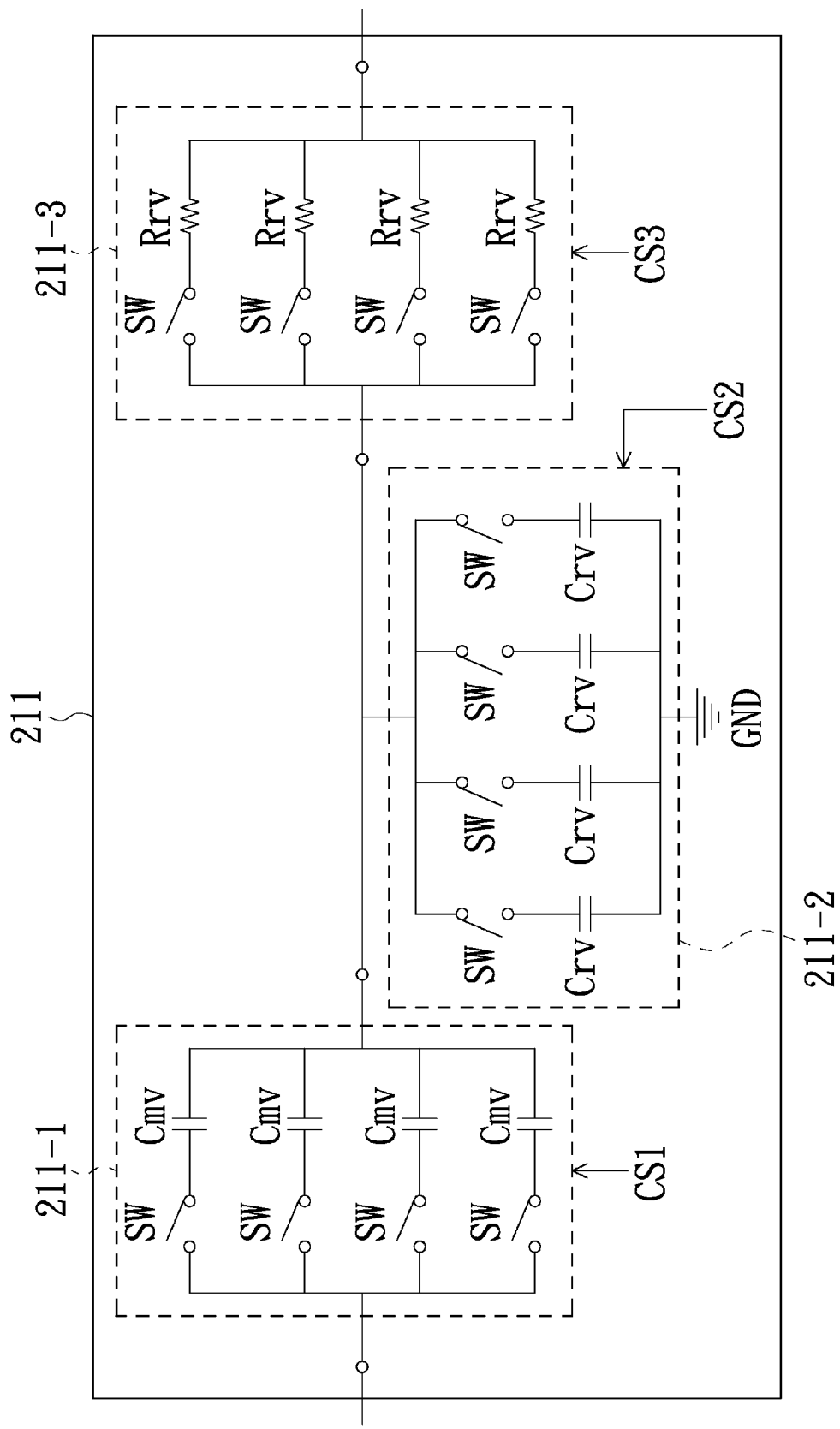
FIG. 4 is a schematic circuit diagram of the load adjustment unit.

FIG. 4 is a schematic circuit diagram of the load adjustment unit 211. Please refer to both of FIGS. 3 and 4. As shown, the load adjustment unit 211 includes a first capacitor module 211-1, a second capacitor module 211-2 and a resistor module 211-3. The first capacitor module 211-1, the second capacitor module 211-2 and the resistor module 211-3 each have a first end and a second end. Specifically, the first end of the first capacitor module 211-1 is electrically coupled to the driving electrode 201a and from which to receive the reference signal. The first capacitor module 211-1 is configured to adjust the capacitance value thereof according to the first control signal CS1. Specifically, the first capacitor module 211-1 includes a plurality of capacitors Cmv and a plurality of switches SW. The capacitors Cmv in the first capacitor module 211-1 are arranged in parallel and corporately electrically coupled to the second end of the first capacitor module 211-1 by one ends thereof and corporately electrically coupled to the first end of the first capacitor module 211-1 by the other one ends thereof via the respective switches SW; wherein the switches SW in the first capacitor module 211-1 are controlled by the first control signal CS1. Thus, the load adjustment unit 211 may adjust the capacitance value of the first capacitor module 211-1 through the first control signal CS1 and thereby adjust the capacitance value of the first capacitor module 211-1 to be matched (or equal) to that of the coupling capacitor Cm. In addition, the relationship between the capacitance value of the first capacitor module 211-1 and the capacitance value of the coupling capacitor Cm is built in the lookup table stored in the control unit 221.

As illustrated in FIG. 4, the first end of the second capacitor module 211-2 is electrically coupled to the second end of the first capacitor module 211-1; and the second end of the second capacitor module 211-2 is electrically coupled to ground GND. The second capacitor module 211-2 is configured to adjust the capacitance value thereof according to the second control signal CS2. Specifically, the second capacitor module 211-2 includes a plurality of capacitors Cry and a plurality of switches SW. The capacitors Cry in the second capacitor module 211-2 are arranged in parallel and corporately electrically coupled to the second end of the second capacitor module 211-2 by one ends thereof and corporately electrically coupled to the first end of the second capacitor module 211-2 by the other one ends thereof via the respective switches SW; wherein the switches SW in the second capacitor module 211-2 are controlled by the second control signal CS2. Thus, the load adjustment unit 211 may adjust the capacitance value of the second capacitor module 211-2 through the second control signal CS2 and thereby adjust the capacitance value of the second capacitor module 211-2 to be matched (or equal) to that of the capacitor Cr in the sensing electrode 203a. In other words, through the second control signal CS2, the impedance of the second capacitor module 211-2 can be adjust to match (or equal) to that of the capacitor Cr in the sensing electrode 203a. In addition, the relationship between the capacitance value of the second capacitor module 211-2 and the capacitance value of the capacitor Cr is built in the lookup table stored in the control unit 221.

As illustrated in FIG. 4, the first end of the resistor module 211-3 is electrically coupled to the first end of the second capacitor module 211-2; and the second end of the resistor module 211-3 is electrically coupled to the second end of the comparator 213. The resistor module 211-3 is configured to adjust the resistance value thereof according to the third control signal CS3. Specifically, the resistor module 211-3 includes a plurality of resistors Rrv and a plurality of switches SW. The resistors Rrv in the resistor module 211-3 are arranged in parallel and corporately electrically coupled to the second end of the resistor module 211-3 by one ends thereof and corporately electrically coupled to the first end of the resistor module 211-3 by the other one ends thereof via the respective switches SW; wherein the switches SW in the resistor module 211-3 are controlled by the third control signal CS3. Thus, the load adjustment unit 211 may adjust the resistance value of the resistor module 211-3 through the third control signal CS3 and thereby adjust the resistance value of the resistor module 211-3 to be matched (or equal) to that of the resistor Rr. In addition, the relationship between the resistance value of the resistor module 211-3 and the resistance value of the resistor Rr is built in the lookup table stored in the control unit 221.

Figure 5:
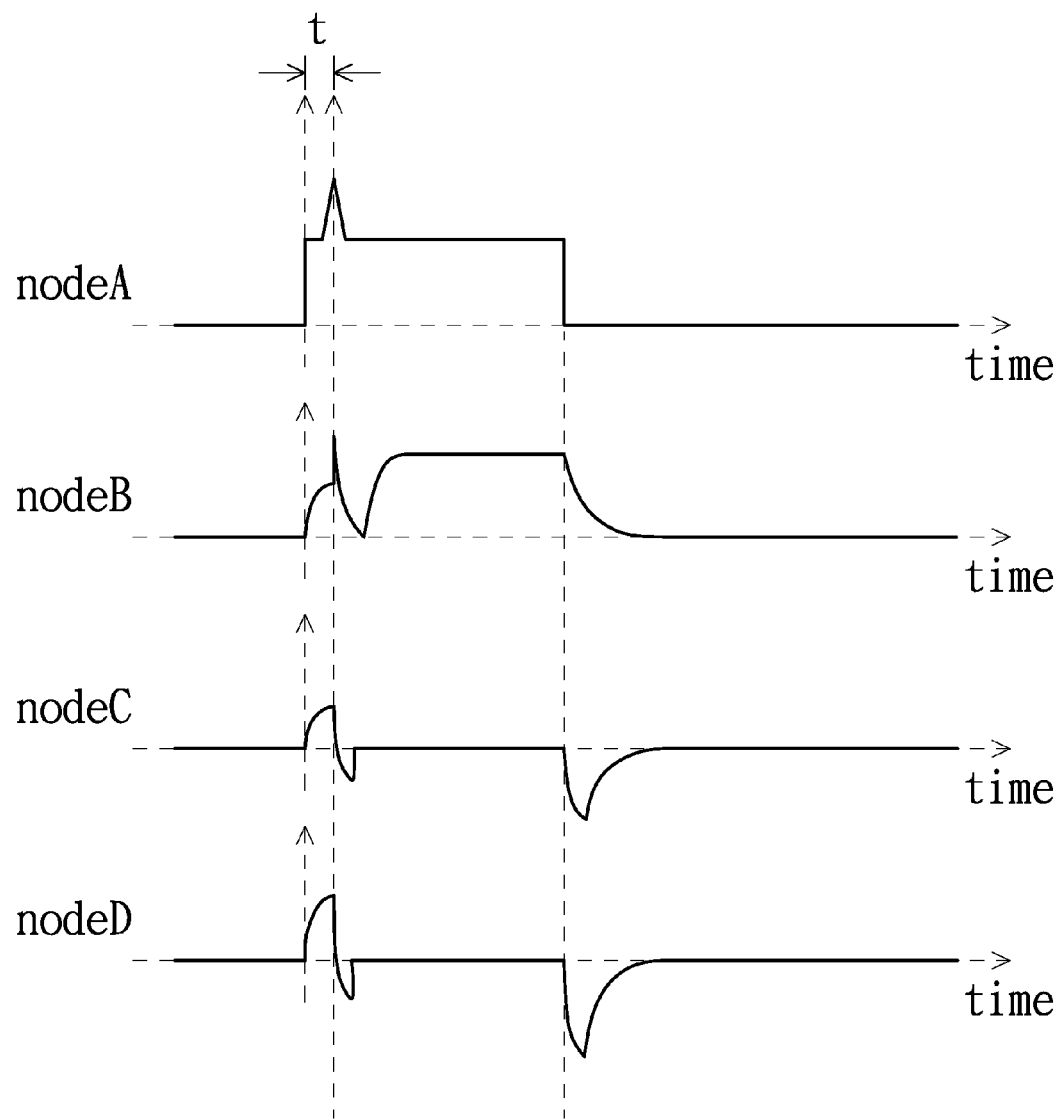
FIG. 5 is a schematic timing diagram of signals at nodes A, B, C and D in FIG. 3.

FIG. 5 is a schematic timing diagram of signals at nodes A, B, C and D in FIG. 3. In FIG. 5, the signal at the node A is the driving signal outputted from the signal source 217; the signal at the node B is the reference signal outputted from the driving electrode 201a; the signal at the node C is the sensing signal outputted from the sensing electrode 203a; and the signal at the node D is the reference signal outputted from the sensing electrode 203a via the load adjustment unit 211. As shown in FIG. 5, both of the signals at nodes C and D simultaneously have the same noise component while the touch apparatus 20 is being affected by noises at time t. In other words, because the sensing signal and the reference signals inputted into the comparator 213 both have the same noise component, the comparator 213 can correctly output the comparison result when performing the comparison operation on the sensing signal and the reference signals with the same noise component. Thus, the touch circuit chip 210 of the present disclosure can correctly determine whether there exists a change on the coupling capacitors Cm between the sensing electrodes 203a~203e and the driving electrode 201a~201e, and consequentially correctly determine whether the touch panel 200 is being touched or not.

In summary, by additionally implementing a touch circuit chip with a load adjustment unit and a comparator, configuring the comparator to have one end thereof for receiving a sensing signal outputted from a sensing electrode and the other end thereof for receiving a reference signal outputted from a driving electrode via the load adjustment unit, configuring the comparator to perform a comparison operation on the received sensing signal and the reference signal and accordingly output a comparison result, and configuring the load adjustment unit to adjust a predetermined impedance value thereof to match (or equal) to the impedance value of a coupling capacitor and the sensing electrode, the comparator in the touch circuit chip of the present disclosure can, while noises occurring, correctly output the comparison result due to noise factor is simultaneously introduced in both of the sensing signal and the reference signal. Consequentially, the touch circuit chip of the present disclosure can overcome the effects of noises and correctly determine whether there exists a change on the coupling capacitor between the sensing electrode and the driving electrode without employing a filter. Thus, the touch apparatus using the touch circuit chip of the present disclosure can correctly determine whether the touch panel thereof is being touched or not.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A touch circuit chip, comprising:
a load adjustment unit configured to adjust a determined impedance value according to an impedance matching signal; and
a first comparator having a first end, a second end and an output end, the first end of the first comparator being electrically coupled to a sensing electrode and from which to receive a sensing signal, the second end of the first comparator being electrically coupled to the load adjustment unit, and the load adjustment unit being coupled to a driving electrode, the second end of the first comparator receiving a reference signal from the driving electrode, the first comparator being configured to compare a voltage of the received sensing signal with a voltage of the received reference signal and accordingly output a comparison result via the output end thereof, the touch circuit chip being configured to determine whether there exists a change of a capacitance value of a coupling capacitor formed at an intersecting point resulted by the intersection of the sensing electrode and the driving electrode according to the comparison result, wherein the determined impedance value is matched to the impedance value of the coupling capacitor and the sensing electrode.

2. The touch circuit chip according to claim 1, wherein the impedance matching signal comprises at least a first control signal, at least a second control signal and at least a third control signal, and the load adjustment unit comprises: a first capacitor module having a first end and a second end, the first end of the first capacitor module being electrically coupled to the driving electrode and from which to receive the reference signal, the first capacitor module being configured to adjust a capacitance value thereof according to the first control signal; a second capacitor module having a first end and a second end, the first end of the second capacitor module being electrically coupled to the second end of the first capacitor module, the second end of the second capacitor module being electrically coupled to ground, the second capacitor module being configured to adjust a capacitance value thereof according to the second control signal;

and a resistor module having a first end and a second end, the first end of the resistor module being electrically coupled to the first end of the second capacitor module, the second end of the resistor module being electrically coupled to the second end of the first comparator, the resistor module being configured to adjust a resistance value thereof according to the third control signal.

3. The touch circuit chip according to claim 2, wherein the first capacitor module comprises a plurality of capacitors, the capacitors are arranged in parallel and corporately electrically coupled to the second end of the first capacitor module by one ends thereof and corporately electrically coupled to the first end of the first capacitor module by the other ends thereof via a plurality of switches respectively, wherein the switches are controlled by the first control signal.

4. The touch circuit chip according to claim 2, wherein the second capacitor module comprises a plurality of capacitors, the capacitors are arranged in parallel and corporately electrically coupled to the second end of the second capacitor module by one ends thereof and corporately electrically coupled to the first end of the second capacitor module by the other ends thereof via a plurality of switches respectively, wherein the switches are controlled by the second control signal.

5. The touch circuit chip according to claim 2, wherein the resistor module comprises a plurality of resistors, the resistors are arranged in parallel and corporately electrically coupled to the second end of the resistor module by one ends thereof and corporately electrically coupled to the first end of the resistor module by the other ends thereof via a plurality of switches respectively, wherein the switches are controlled by the third control signal.

6. The touch circuit chip according to claim 2, further comprising: a dynamic detection unit, electrically coupled to the sensing electrode through a switch, configured to detect an impedance value of the sensing electrode and the coupling capacitor and accordingly output a detection information; and a control unit, electrically coupled to the dynamic detection unit, configured to receive the detection information from the dynamic detection unit, compare the detection information with a lookup table stored therein and accordingly output the first control signal, the second control signal and the third control signal, wherein the switch is switched-off while the predetermined impedance value of the load adjustment unit is adjusted to match to the impedance value of the sensing electrode and the coupling capacitor.

7. The touch circuit chip according to claim 6, wherein the dynamic detection unit is further configured to calculate the impedance value of the sensing electrode and the coupling capacitor according to a voltage, a current or the both and thereby generate the detection information.

8. The touch circuit chip according to claim 1, further comprising: a readout amplification unit, electrically coupled to the output end of the first comparator, configured to amplify the comparison result outputted from the first comparator and accordingly generate an amplification signal, wherein the touch circuit chip determines whether there exists a change of the capacitance value of the coupling capacitor according to the amplification signal generated by the readout amplification unit.

9. The touch circuit chip according to claim 8, wherein the readout amplification unit comprises: a second comparator having a first end, a second end and an output end, the first end of the second comparator being electrically coupled to the output end of the first comparator, and the second end of the second comparator being electrically coupled to ground; and a capacitor having a first end and a second end, the first end of the capacitor being electrically coupled to the first end of the second comparator, and the second end of the capacitor being electrically coupled to the output end of the second comparator.

10. The touch circuit chip according to claim 1, wherein the output end of the first comparator is electrically coupled to ground via a capacitor.

11. The touch circuit chip according to claim 1, wherein one end of the driving electrode is electrically coupled to a signal source and from which to receive a driving signal.

12. A touch apparatus, comprising:
a touch panel comprising a plurality of driving electrodes and a plurality of sensing electrodes arranged in an intersection manner, and a coupling capacitor being formed at each of intersecting points resulted by the intersection of the driving electrodes and the sensing electrodes; and
a touch circuit chip electrically coupled to the touch panel, the touch circuit chip comprising:
a load adjustment unit configured to adjust a determined impedance value according to an impedance matching signal, and the determined impedance value being matched to an impedance value of the coupling capacitor and one of the sensing electrode; and a first comparator having a first end, a second end and an output end, the first end of the first comparator being electrically coupled to one of the sensing electrodes and from which to receive a sensing signal, the second end of the first comparator being electrically coupled to the load adjustment unit, and the load adjustment unit being coupled to one of the driving electrodes, the second end of the first comparator receiving a reference signal from the driving electrodes, the first comparator being configured to compare a voltage of the received sensing signal with a voltage of the received reference signal and accordingly output a comparison result via the output end thereof, the touch circuit chip being configured to determine whether there exists a change of a capacitance value of the coupling capacitors according to the comparison result.

13. The touch apparatus according to claim 12, wherein the impedance matching signal comprises at least a first control signal, at least a second control signal and at least a third control signal, and the load adjustment unit comprises: a first capacitor module having a first end and a second end, the first end of the first capacitor module being electrically coupled to one of the driving electrodes and from which to receive the reference signal, the first capacitor module being configured to adjust a capacitance value thereof according to the first control signal; a second capacitor module having a first end and a second end, the first end of the second capacitor module being electrically coupled to the second end of the first capacitor module, the second end of the second capacitor module being electrically coupled to ground, the second capacitor module being configured to adjust a capacitance value thereof according to the second control signal; and a resistor module having a first end and a second end, the first end of the resistor module being electrically coupled to the first end of the second capacitor module, the second end of the resistor module being electrically coupled to the second end of the first comparator, the resistor module being configured to adjust a resistance value thereof according to the third control signal.

14. The touch apparatus according to claim 13, wherein the first capacitor module comprises a plurality of capacitors, the capacitors are arranged in parallel and corporately electrically coupled to the second end of the first capacitor module by one ends thereof and corporately electrically coupled to the first end of the first capacitor module by the other ends thereof via a plurality of switches respectively, wherein the switches are controlled by the first control signal.

15. The touch apparatus according to claim 13, wherein the second capacitor module comprises a plurality of capacitors, the capacitors are arranged in parallel and corporately electrically coupled to the second end of the second capacitor module by one ends thereof and corporately electrically coupled to the first end of the second capacitor module by the other ends thereof via a plurality of switches respectively, wherein the switches are controlled by the second control signal.

16. The touch apparatus according to claim 13, wherein the resistor module comprises a plurality of resistors, the resistors are arranged in parallel and corporately electrically coupled to the second end of the resistor module by one ends thereof and corporately electrically coupled to the first end of the resistor module by the other ends thereof via a plurality of switches respectively, wherein the switches are controlled by the third control signal.

17. The touch apparatus according to claim 13, further comprising: a dynamic detection unit, electrically coupled to one of the sensing electrodes through a switch, configured to detect an impedance value of one of the sensing electrodes and the respective coupling capacitor and accordingly output a detection information; and a control unit, electrically coupled to the dynamic detection unit, configured to receive the detection information from the dynamic detection unit, compare the detection information with a lookup table stored therein and accordingly output the first control signal, the second control signal and the third control signal, wherein the switch is switched-off while the predetermined impedance value of the load adjustment unit is adjusted to match to the impedance value of one of the sensing electrodes and the coupling capacitor.

18. The touch apparatus according to claim 17, wherein the dynamic detection unit is further configured to calculate the impedance value of one of the sensing electrodes and the coupling capacitor according to a voltage, a current or the both and thereby generate the detection information.

19. The touch apparatus according to claim 12, wherein the touch circuit chip further comprises: a readout amplification unit, electrically coupled to the output end of the first comparator, configured to amplify the comparison result outputted from the first comparator and accordingly generate an amplification signal, wherein the touch circuit chip determines whether there exists a change of the capacitance value of the coupling capacitor according to the amplification signal generated by the readout amplification unit.

20. The touch apparatus according to claim 19, wherein the readout amplification unit comprises: a second comparator having a first end, a second end and an output end, the first end of the second comparator being electrically coupled to the output end of the first comparator, and the second end of the second comparator being electrically coupled to ground; and a capacitor having a first end and a second end, the first end of the capacitor being electrically coupled to the first end of the second comparator, and the second end of the capacitor being electrically coupled to the output end of the second comparator.

21. The touch apparatus according to claim 12, wherein the output end of the first comparator is electrically coupled to ground via a capacitor.

22. The touch apparatus according to claim 12, wherein one end of the driving electrode is electrically coupled to a signal source and from which to receive a driving signal.

* * * * *